United States Patent [19]

Maeda

[11] Patent Number: 4,920,527

[45] Date of Patent: Apr. 24, 1990

[54] FOCUSING ERROR DETECTION APPARATUS

[75] Inventor: Takanori Maeda, Saitama, Japan

[73] Assignee: Pioneer Electronic Corp., Tokyo, Japan

[21] Appl. No.: 141,394

[22] Filed: Jan. 7, 1988

[30] Foreign Application Priority Data

Jan. 7, 1987 [JP] Japan .................................. 62-2160

[51] Int. Cl.⁵ .............................................. G11B 7/13
[52] U.S. Cl. ................................................... 369/45
[58] Field of Search .................................. 369/44–46; 250/201 DF

[56] References Cited

U.S. PATENT DOCUMENTS

| | | |
|---|---|---|
| 4,243,848 | 1/1981 | Utsumi . |
| 4,625,303 | 11/1986 | Shikama et al. ........................ 369/45 |
| 4,658,391 | 4/1987 | Nozu et al. ............................. 369/45 |
| 4,695,158 | 9/1987 | Kotaka et al. ......................... 369/46 |
| 4,724,533 | 2/1988 | Ohara et al. ........................... 369/45 |
| 4,725,725 | 2/1988 | Ando ...................................... 369/46 |
| 4,815,060 | 3/1989 | Nomura ................................. 369/46 |

FOREIGN PATENT DOCUMENTS

| | | |
|---|---|---|
| 0121989 | 10/1984 | European Pat. Off. . |
| 0127448 | 12/1984 | European Pat. Off. . |
| 3132818 | 4/1982 | Fed. Rep. of Germany . |
| 3604722 | 9/1986 | Fed. Rep. of Germany . |

*Primary Examiner*—Donald McElheny, Jr.
*Attorney, Agent, or Firm*—Sughrue, Mion, Zinn, Macpeak & Seas

[57] ABSTRACT

A light beam focusing apparatus for maintaining a level of a focus error signal below an acceptable reference value. A trisection photodetector is provided, a level of a focus error signal being calculated in accordance with three photodetector outputs which result from a light beam striking the trisection photodetector. A distance dc which the light beam can deviate from a center of a central section of the trisection photodector while maintaining a level of the focus error signal below the acceptable reference value is determined in accordance with the formula $2r+dc>a+b+c$, wherein r is the radius of the light beam striking the trisection photodetector, a is a width of the central section of the photodetector, and b and c are the respective widths of the other two sections of the photodetector.

8 Claims, 5 Drawing Sheets

FOCUSING ERROR DETECTION APPARATUS

BACKGROUND OF THE INVENTION

The present invention relates to a light beam focusing apparatus for use in a disk reproducing apparatus, and particularly to a focus error detection apparatus employing a trisection photodetector.

Disk players for reproducing information recorded on an information recording disk such as a video disk, a digital audio disk, or the like, employ focusing servo apparatuses for maintaining accurate focus of an information detection light beam on a recording surface of the disk. In such focusing servo apparatuses, the focus error of a beam convergent lens for focusing a light beam on the recording surface of the disk is detected, and the position of the beam convergent lens along an optical axis of the light beam is controlled in accordance with the detected focus error.

A number of methods have been used for detecting focus error, including what are referred to as an astigmatism method, a beam-diameter measurement method, a knife-edge method, and a critical-angle method. Of these methods, both the astigmatism method and the beam-diameter measurement method employ a belt-like photodetector having a light reception surface which is divided into three sections. These sections generally are positioned consecutively with respect to what may be referred to as a reference axis. The light beam striking such a photodetector will cause three photodetector outputs to be provided in accordance with the position of the light beam with respect to the sections of the photodetector.

FIG. 6 shows an example of an optical system which is part of a focus error detection apparatus, and exemplifies the astigmatism method. In the Figure, a light beam is emitted from a light source 1, such as a laser diode. The light beam is made incident onto a beam convergent lens 3 through a beam splitter 2, and thus is converged onto a recording surface of a disk 4. A light beam reflected from the recording surface of the disk 4 passes again through the beam convergent lens 3 and strikes a portion 2a of the beam splitter 2 so as to be reflected towards a cylindrical lens 5.

The lens 5 imparts astigmatism to the reflected beam, and causes the thus altered beam to strike a light reception surface of a photodetector, such as the photodetector 6 shown in FIG. 7 of the application. Such photodetector is disposed with respect to the cylindrical lens 5 such that the light reception surface of the photodetector has a position wherein, with respect to two focal lines $L_1$ and $L_2$, shown in FIG. 6, a cross section of luminous flux of the light beam output by the lens 5 is circular.

As shown in FIG. 7, a focus error FE is obtained in accordance with the equation $P_A - (P_B + P_C)$. This expression is obtained as follows. The light reception outputs $P_B$ and $P_C$ are added in an adder 7, and the output of the adder 7 is provided to a negative input of an differential amplifier 8. The output $P_A$ of the central section A of the photodetector 6 is provided to a positive input of the differential amplifier 8.

In accordance with the astigmatism method mentioned above, if the beam convergent lens 3 is displaced from a position of focus, the shape of the light beam will become elliptical, as shown in FIGS. 8(A) and 8(C). A properly focused beam would be circular, and would appear as shown in of FIG. 8(B). In any event, an unfocused beam would cause the sum of the outputs $P_B + P_C$ either to increase (FIG. 8(A)) or decrease (FIG. 8(C)).

On the other hand, in accordance with the beam-diameter measuring method mentioned above, an optical system slightly different from that used for the astigmatism method is employed, and the results may be described with reference to FIG. 9(A–C). A properly-focused beam would appear as in FIG. 9(B). An improperly-focused beam may appear as shown in FIG. 9(A)–9(C), so that the diameter of an unfocused beam would be larger or smaller than desired. Either of the situations in FIGS. 8(A), 8(C), 9(A) or 9(C) will provide a focus error FE which is nonzero, whereas the situations in FIGS. 8(B) and 9(B) will provide a focus error FE equal to zero (that is , $P_A - (P_B + P_C) = 0$).

In the apparatuses employed in each of the above-mentioned focus error detection methods, each of the widths b and c of the outer light reception surface sections B and C of the photodetector 6, as measured along an axis perpendicular to the above-mentioned reference axis (that is, in the direction perpendicular to the dividing lines in the light reception surface) is selected to be at least as large the width a of the central light reception surface section A. Thus, in the case where the center of the light beam and the center of the light reception surface do not coincide, and in fact deviate along the above-mentioned second axis, a non-zero focus error signal FE will be generated in accordance with the size of that deviation.

For example, assume a light beam strikes the photodetector as shown in FIG. 10, which shows some deviation of the center of the light beam from the center of the photodetector. As the center of the light beam is moved with respect to the center of the photodetector, outputs of the various sections A–C may be depicted as shown in FIG. 11. In that figure, the abscissa represents the degree of separation of the center of the light beam from the center of the light reception surface, given a light beam radius equal to 1, and the ordinate represents the output level of the light reception surfaces of FIGS. 7 and 10. The output level may be set to 1 when the light reception surface receives all of the light beam output, as shown in FIG. 7. In this case, each of the widths b and c of the photodetector 6 are set equal to the width a of the central light reception surface section ($a = b = c = 0.808$). Selection of those width values makes the amount of light received in the central portion A equal to the sum of the respective amounts of light received by the sections B and C when the light beam is properly focused, as shown in FIGS. 8(B) and 9(B). As can be seen in FIG. 11, for the various photodetector outputs $P_A$, $P_B$, and $P_C$ for the structure of the photodetector shown in FIGS. 7 and 10, there is a very limited range wherein the difference $P_A - (P_B + P_C)$ is close to 0.

Looking at a different situation, wherein the photodetector has a shape shown in FIG. 12 of the application, in which the widths b and c are set to a value equal to 2.0, a relation of focus error signal to deviations of light beam center from the center of the photodetector may be depicted as shown in FIG. 13. Again, there is a very small range bounding the zero point on the abscissa wherein the difference $P_A - (P_B + P_C)$ is substantially equal to 0.

Thus, in conventional apparatuses, it is difficult to obtain a stable focus error signal FE, because even relatively slight deviations of the center of the light beam from the center of the photodetector as measured along the above-mentioned second axis can cause great variations in the level of the focus error signal.

SUMMARY OF THE INVENTION

In view of the foregoing deficiencies, it is an object of the present invention to provide a focus error detection apparatus which provides a stable focus error signal for a wider range of deviation of light beam center from a center of the photodetector as measured along an axis perpendicular to an axis with respect to which the photodetector is divided into at least three sections.

Thus, in accordance with the present invention, the inventive focus error detection apparatus includes a photodetector having a light reception surface divided into at least three sections, a central section having width a and sections surrounding that central section having widths b and c, the apparatus being arranged so that a light beam is striking the photodetector has a radius r, the overall apparatus being structured so that the relation $2r+dc>a+b+c$ holds. In this equation, dc represents a maximum acceptable deviation of the light beam center from the center of the photodetector in a direction perpendicular to the axis along which the photodetector is divided, such that the value of the focus error signal FE does not exceed a predetermined reference value.

BRIEF DESCRIPTION OF THE DRAWINGS

The foregoing object and structure, and other objects and advantages of the present invention now will be described with reference to the accompanying drawings in which.

DETAILED DESCRIPTION OF THE PREFERRED EMBODIMENT

An embodiment of the present invention now will be described with reference to the accompanying drawings.

Figure 1:
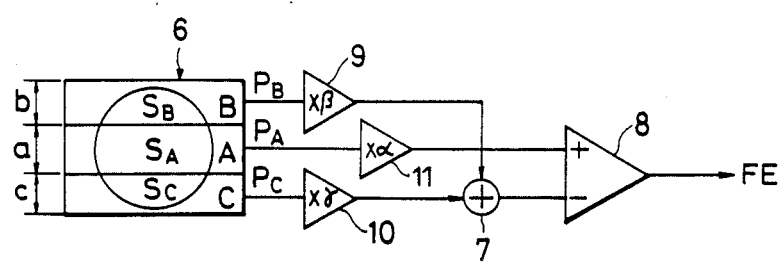
FIG. 1 is a block diagram showing a focus error detection apparatus arranged in accordance with the present invention.

Generally, when a light beam is incident onto a photodetector, the output $P_o$ of the photodetector is $$P_o = \int_S \rho(\sigma)d\sigma$$

where S represents an incident area of the light beam and $\rho(\sigma)$ represents light density at various points $\sigma$ in the area S. If the light reception surface of the photodetector were divided into three light reception surface sections A, B and C having widths a, b, c respectively and having sufficient lengths in the direction of the dividing lines as shown in FIG. 1, and the amount of deviation of the center of the light beam from the center of the light reception surface of the photodetector is represented by h, then the outputs $P_A$, $P_B$, and $P_C$ of the light reception surface sections A, B and C are expressed as follows:

$$P_A = \int_{S_A(h)} \rho(\sigma)d\sigma$$

$$P_B = \int_{S_B(h)} \rho(\sigma)d\sigma$$

$$P_C = \int_{S_C(h)} \rho(\sigma)d\sigma$$

wherein $S_A(h)$, $S_B(h)$, and $S_C(h)$ represent incident areas on the light reception surface sections A, B, and C respectively. If the signal amplification factor $\alpha$ for the output of the light reception surface section A is selected to be 1 and the signal amplification factors for the outputs of the light reception surface sections B and C are selected to be $\beta$ and $\gamma$ respectively, the focusing error signal FE derived by the circuit of FIG. 1 would be expressed as follows:

$$FE = P_A - (\beta P_B + \gamma P_C) = \frac{\rho(\sigma)d\sigma}{S_A(h)} - \left\{ \frac{\rho(\sigma)d\sigma}{S_B(h)} + \frac{\rho(\sigma)d\sigma}{S_C(h)} \right\}$$

According to the present invention, on the assumption that the signal amplification factors $\beta$ and $\gamma$ are set in advance, the widths a, b, and c of the light reception surface sections A, B, and C are selected so as to satisfy the inequality $$2r+dc>a+b+c$$

in which dc represents an amount of deviation of the light beam from the center of the light reception surface in the dividing direction of the light reception surface in a focused state when a value of the focus error signal FE does not exceed a permissible maximum value $FE_o$ and r represents the radius of the beam cross-section. Of course, if the signal amplification factors $\sigma$, $\beta$, and $\gamma$ change, the respective values of the widths a, b, and c will change correspondingly. Further, if the value of the spot radius r is determined when $\sigma=1$, the value of the width a of the light reception surface section A is determined correspondingly, and the values of the widths b and c of the light reception surface sections B and C and the values of the signal amplification factors $\beta$ and $\gamma$ are determined relative to the value of the width a.

In accordance with the present invention, the maximum value $FE_o$ is set to a value substantially equal to zero, but so as to maximize an acceptable range of values for dc. Therefore, the widths b and c of the light reception surface sections B and C and the signal amplification factors $\beta$ and $\gamma$ are selected relative to the width a of the light reception surface section A so as to maximize the light beam center deviation range in which the quantity of change of the focusing error signal FE is substantially equal to zero.

The foregoing may be expressed as the following integral:

$$\int_u^v |FE(a, b, c)| dh \approx 0$$

wherein u and v respectively represent the smallest and largest values of the foregoing maximum deviation range dc. Therefore, a focusing error detection apparatus having superior stability can be obtained by setting the widths b and c and the signal amplification factors $\beta$ and $\gamma$ relative to the width a so as to maximize $(v-u)$.

Figure 2:
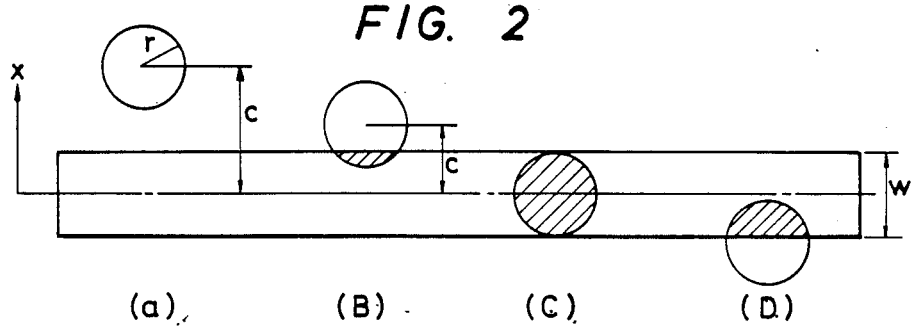
FIG. 2 is a diagram showing four positions (A)–(D) of a light beam with respect to a light reception surface of the photodetector.

Next, the present invention will be described with respect to a simple specific example. For the purpose of simplicity of explanation, it will be assumed that in a focused state the shape of light beam on the light reception surface of the photodetector 6 always is perfectly circular and the light intensity distribution within the circle is uniform. Then, the incident light quantity $P_o$ to the photodetector 6 when the light beam is in a positional relation relative to the photodetector 6 as shown in each of (A) through (D) of FIG. 2 can be obtained as follows:

(1) $P_o = 0$, in the state (A) where the condition $2c - w > 2r$, or $2c + w < 2r$ is satisfied;

(2)
$$P_o = 2 \times \int_{c-w/2}^{r} \sqrt{r^2 - x^2}\, dx ,$$

in the state (D) where the condition $2r \geq 2c - w \geq -2r$, or $2c + w > 2r$ is satisfied;

(3) $P_o = \pi r^2$, in the state (C) where the condition $2c - w < -2r$, or $2c + w > 2r$ is satisfied; and (4)
$$P_o = 2 \times \int_{r}^{c-w/2} -\sqrt{r^2 - x^2}\, dx ,$$

in the state (D) where the condition $2r \geq 2c + w \geq -2r$, or $2c - w < 2r$ is satisfied;

where r represents the radius of the light beam in cross-section, c represents the distance between the center of the light beam and the center of the light reception surface of the photodetector 6 in the surface dividing direction, w represents the width of the photodetector 6 in the surface dividing direction, x represents an integration constant and an ordinate in the dividing direction of the light reception surface of the photodetector 6 (in the direction perpendicular to a dividing line).

Figure 3:
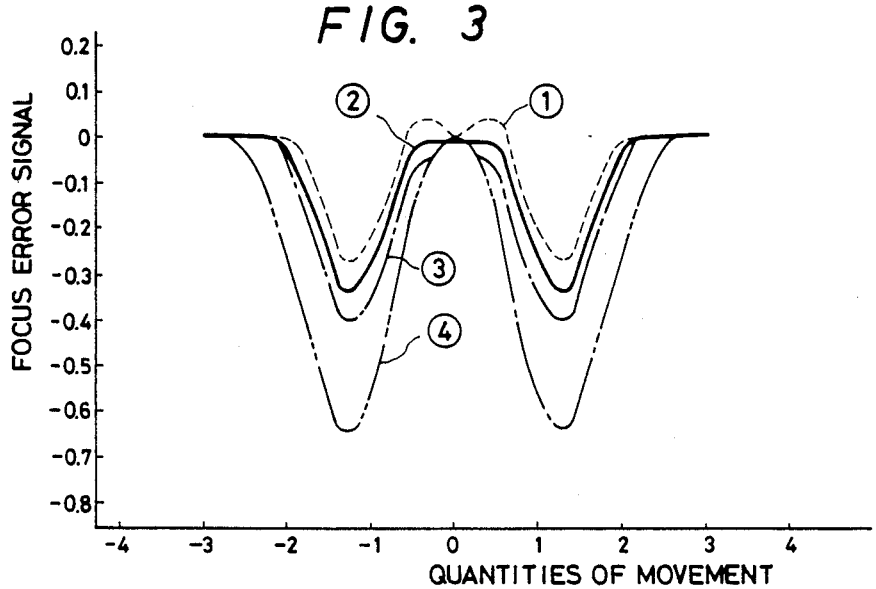
FIG. 3 is a graph depicting the relationship between a deviation of a center of a light beam with respect to a center of the photodetector and the level of a focus error signal.

FIG. 3 shows a change in the focusing error signal level relative to a quantity of movement of the light beam center in the surface dividing direction. More specifically, FIG. 3 shows a relationship between change in difference between the quantity of light incident on the central reception surface section A and the sum of quantities of light incident on the opposite-side light reception surface sections B and C, in the case where the width a of the central light reception surface section A of the photodetector 6 on which the center of the light beam exists is selected on the basis of the foregoing expression, so that a half of the whole quantity of received light is made incident onto the light reception surface section A. In the figure, the abscissa represents the position of the center of the light beam in the dividing direction when the beam radius is normalized to 1, and the ordinate represents the value of the focusing error signal, $P_A - (P_B + P_C)$ when the whole quantity of received light is normalized to be 1.

Figure 4:
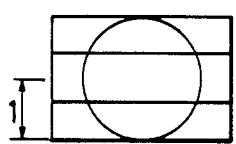
FIGS. 4(1)–4(4) depict a relative size of a light beam contacting a photodetector with respect to a photodetector of various sizes.
Figure 4:
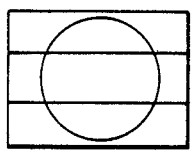
Figure 4:
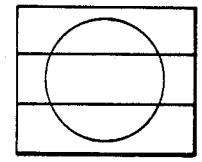
Figure 4:
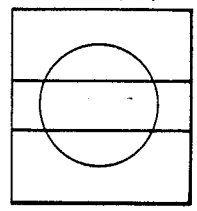

Further, the curves (1) through (4) of FIG. 3 show the results when photodetectors having shapes as shown in the diagrams of FIGS. 4(1) through 4(4) are employed, respectively, that is, the curves (1), (3), and (4) represent the respective cases for a photodetector having a light reception surface which is made equal in width to the light beam diameter ($a=0.808$ and $b=c=0.596$); a photodetector in which each of the widths b and c of the opposite-side light reception surface sections B and C is made equal to the width a of the central light reception surface section A ($a=b=c=0.808$); and a photodetector in which the sum of the width a of the central light reception surface section A and one of the widths b and c of the opposite-side light reception surface sections B and C is made equal to the light beam diameter ($a=0.808$ and $b=c=1.192$).

In each of the cases (1), (3) and (4), the amount of movement of the light beam center from the light reception surface center in which a focal movement is allowed (the maximum light beam deviation range) is not more than 10% of the light beam radius, and therefore in such an arrangement the focus control with respect to the movement of the light beam in the dividing direction becomes remarkably unstable.

According to the present invention, however, the respective widths b and c of the opposite-side light reception surface sections B and C relative to the width a of the central light reception surface section A is set so as to maximize the light beam deviation range, and as the result of numerical calculation, the optimum values of the widths of the opposite-side light reception surface sections B and C are $b=c=0.7$ (as shown in case of FIG. 4(2). If a photodetector thus arranged is used, the width of the maximum deviation range is extended to 86% of the spot radius, thus remarkably improving focus control stability. In such an arrangement, the widths b and c relative to the width a can be selected so as to make a change in $(P_B + P_C)$ most similar to a change in $P_A$ near the central portion of the light reception surface of the photodetector 6. The width a may be selected as desired, so long as it is smaller than the diameter.

The value of each of the widths b and c of the opposite-side light reception surface sections B and C relative to the width a of the central light reception surface section A can be obtained through numerical calculation by using a computer taking into consideration optical conditions such as a pit shape of a disk, performance of an optical system, a property of laser light, and light intensity distribution in a light beam, among others. Further, when the radius r of the light beam is determined, the width a of the central light reception surface section A is determined. Therefore, each of the widths b and c of the opposite-side light reception surface sections B and C can be determined in such a manner that, when the values of the widths b and c are sufficiently larger than the width a of the light reception surface section A, and the signal amplification factors $\beta$ and $\tau$ are set in advance, the light beam may be displaced in the dividing direction of the light reception surface while observing the focusing error signal FE so that the light beam outer diameter position at the position of displacement just less than dc is made to be one of the light reception region limitation positions (i.e., an outer boundary of portion B or C). At that time, as described above, the values of the widths b and c of the light reception surface sections B and C change as the signal amplification factors $\beta$ and $\gamma$ change.

The width a of the central light reception surface section A in the foregoing embodiment is selected so that one-half of the light is received at the center of the light reception surface. However, even if this is not the case, the focus error signal can be made to be zero in a focused state if the structural arrangement is such that amplifiers 9 and 10 are provided for amplifying the outputs $P_B$ and $P_C$ of the light reception surface sections B and C respectively as shown in FIG. 1, so that the focus error signal FE corresponds to a difference between the output $P_A$ of the light reception surface section A and the sum of the outputs of the light reception surface sections B and C after being amplified by amplification factors $\beta$ and $\gamma$.

Figure 5:
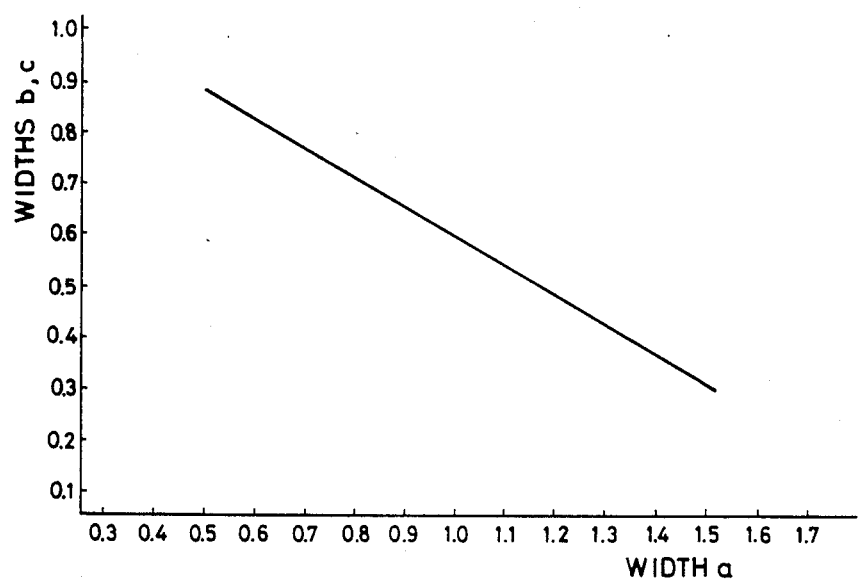
FIG. 5 is a diagram showing a relationship of a width a of a central portion of a trisection photodetector with respect to widths b, c, for a light beam having a cross-sectional diameter of 1.
Figure 6:
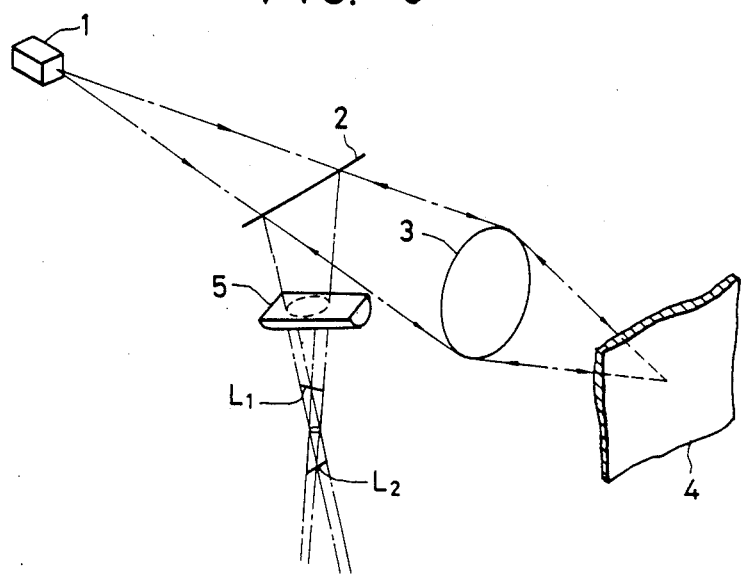
FIG. 6 is a diagram of a light beam producing apparatus employing the astigmatism method.
Figure 7:
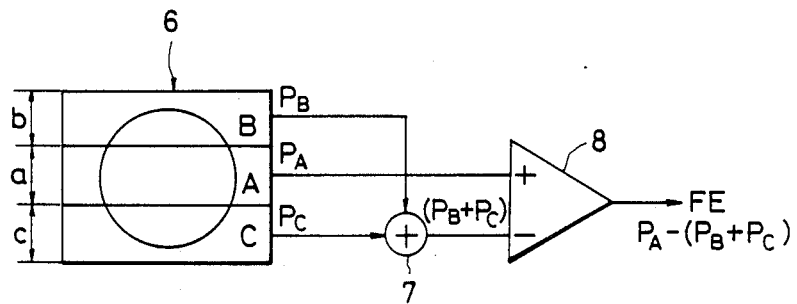
FIG. 7 is an example of a focus error signal producing apparatus employing a trisection photodetector.
Figure 8A:
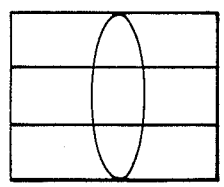
FIGS. 8(A)–8(C) show various shapes of light beams on a given photodetector as would be produced according to the astigmatism method.
Figure 8B:
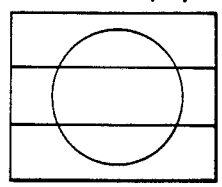
Figure 8C:
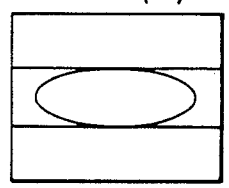
Figure 9A:
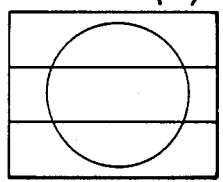
FIGS. 9(A)–9(C) show light beam shapes on a given photodetector surface as would be produced according to a beam-diameter detection method.
Figure 9B:
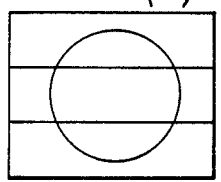
Figure 9C:
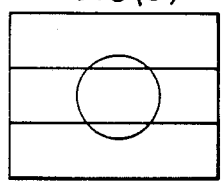
Figure 10:
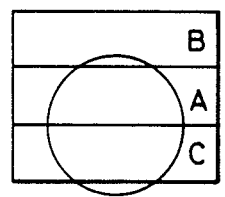
FIG. 10 shows an example of light beam deviation with respect to a photodetector having three sections of equal width.
Figure 12:
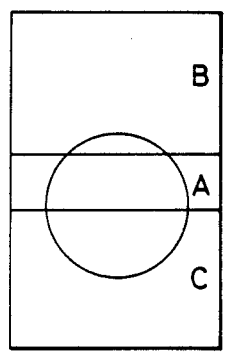
FIG. 12 shows an example of a light beam deviating from the center of a trisection photodetector having outer portions with the width larger than that of the center portion.
Figure 11:
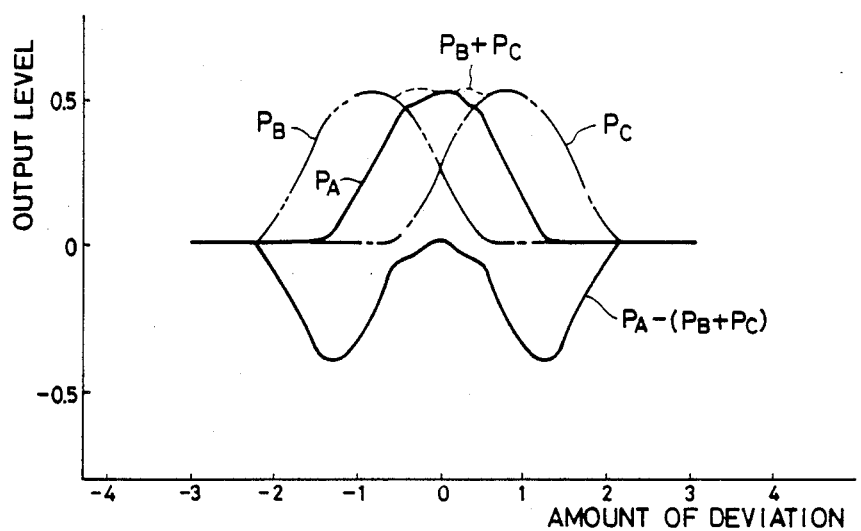
FIG. 11 is a graph depicting the relationship between amount of deviation of the light beam from a center of the photodetector measured along the above-mentioned second axis at a level of a focus error output signal for the photodetector shown in FIG. 10.
Figure 13:
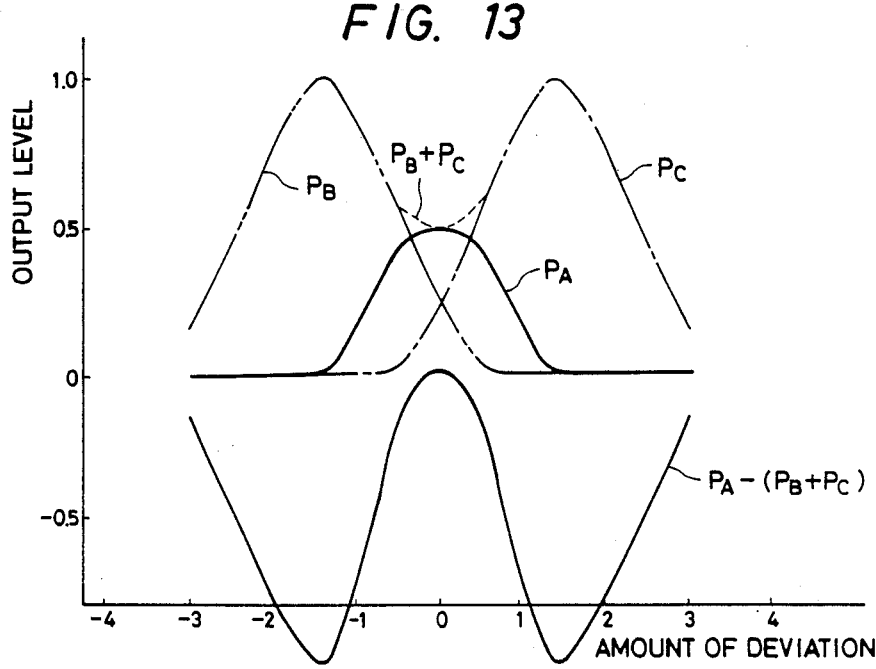
FIG. 13 is a graph showing a relationship between an amount of deviation of a light beam center from a center of a photodetector as shown in FIG. 12 to the magnitude of the focus error signal generated.

FIG. 5 shows the relation between the width a and each of the widths b and c in the case where each of the widths b and c is obtained relative to the width a when the light beam radius is normalized to be 1 as described above. That is, the signal amplification factors $\beta$ and $\gamma$ are determined so as to make the focusing error signal FE zero when the center of the light beam and the center of the light reception surface coincide, and each of the widths b and c is determined relative to the width a so as to maximize the deviation range in which the focusing error signal FE is substantially equal to zero in accordance with the signal amplification factors $\beta$ and $\gamma$.

The description of the foregoing embodiment was provided with reference to an arrangement in which the beam is focused in the state where the external shape of luminous flux of the beam is substantially circular. Thus, the invention is applicable to the above-mentioned beam-diameter measurement method. However, the external shape of the luminous flux may be elliptical, so that the invention may be applicable to the astigmatism method as well.

Although the foregoing embodiment has been described, for the purpose of simplicity of explanation, for the case where the shape of the light beam cross-section is circular and the light intensity distribution is uniform, the optimum shape of the photodetector can be determined by the same calculation as that in the foregoing embodiment even in the case where the shape of the light beam cross-section is not circular because of coma of the light beam, or even in the case where the light intensity distribution is not uniform. Also, although the widths and signal amplification factors are set so as to be $b=c$ and $\beta=\gamma$ in the foregoing embodiment, the same effects can be obtained even in the case where $b\neq c$ and $\beta\neq\gamma$. Further, although the case has been described where the signal amplification factor $\alpha$ for the output of the light reception surface A is selected to be 1 so as not to amplify the output of the light reception surface section A in the foregoing embodiment, it is a matter of course that the output of the light reception surface section A may be amplified in an amplifier 11 by a factor $\alpha$ other than 1.

Although the case has been described where the light reception surface of the photodetector is divided into three sections as in the foregoing embodiment, the present invention is not limited to this case, but rather is similarly applicable to the case where the light reception surface is divided into more than three sections. In the case where the dividing lines of the photodetector have no sensitivity, or in the case where leakage of light into the system is generated, the light reception area actually changes correspondingly, and therefore the shape of the phtodetector may be determined in the same manner as the foregoing embodiment in accordance with the change.

Further, although the width of each of the light reception surface sections is determined on the assumption that the whole surface of each of the light reception surface sections of the photodetector is used as the light reception region in the foregoing embodiment, the light reception region of the photodetector may be limited by providing limitation means in a light path so as to partly cut off the light beam. The same effects then can be obtained by determining the width of each of the limited light reception regions.

According to the present invention, as described above, in a focus error detection apparatus using a photodetector having a light reception surface divided into at least three light reception surface sections, the widths of the light reception regions and the signal amplification factors are determined so as to maximize the permissible deviation of a light beam center from a center of the light reception surface in the dividing direction of the light reception surface. Accordingly, it is possible to obtain a stable focus error signal.

The invention should not be considered to be limited to the embodiments and variations just described, but rather is limited only by the scope of the claims which follow immediately.

What is claimed is:

1. In a disk reproducing apparatus, a light beam focusing apparatus comprising:
   a light beam source;
   a light reception member divided, with respect to a first axis, into three light receiving portions, including a first light receiving portion having a first width a measured along a second axis perpendicular to said first axis, and second and third light receiving portions, one on either side of said first light receiving portion in a direction of said second axis, and having second and third widths b and c, respectively, measured along said second axis, said light reception member being positioned so as to intersect an optical axis of the light being emitted by said light beam source, first, second, and third photodetector outputs respectively being output in response to said light beams striking said first, second and third light receiving portions, said light beam having a radius r at a point of contact with said light reception surface; and focus error signal producing means for combining said first, second, and third outputs to provide a focus error signal indicative of focus error, wherein said first, second, and third widths are determined in accordance with the following formula:

$$2r+dc>a+b+c,$$

wherein dc is a maximum distance that said light beam can deviate along said second axis from a center of said first light receiving portion while said level of said focus error signal remains below a predetermined reference value.

2. A light beam focusing apparatus as claimed in claim 1, wherein said focus error signal producing means comprising:

means for multiplying said first photodetector output by said first value to produce said first multiplied photodetector output;

means for multiplying said second photodetector output by a second value to produce a second mulitplied photodetector output;

means for multiplying said third photodetector output by a third value to produce a third multiplied photodetector output;

means for adding said second and third multiplied photodetector outputs to provide a summed output; and means for deriving a difference between said first multiplied photodetector output and said summed output to provide said focus error signal.

3. A light beam focusing apparatus as claimed in claim 2, wherein said first value is 1.

4. A light beam focusing apparatus as claimed in claim 2, wherein said second and third values are equal.

5. A light beam focusing apparatus as claimed in claim 1, wherein said second and third widths are equal.

6. A light beam focusing apparatus as claimed in claim 5, wherein said second and third widths are equal to 0.7r.

7. A light beam focusing apparatus as claimed in claim 6, wherein said first width is selected so as not to exceed 2r.

8. A light beam focusing apparatus as claimed in claim 1, wherein said first, second, and third widths are equal.

* * * * *